US008170212B2

(12) United States Patent
Pering et al.

(10) Patent No.: US 8,170,212 B2
(45) Date of Patent: May 1, 2012

(54) DEVICE, SYSTEM, AND METHOD OF ESTABLISHING SECURE WIRELESS COMMUNICATION

(75) Inventors: Trevor A. Pering, Palo Alto, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 12/049,833

(22) Filed: Mar. 17, 2008

(65) Prior Publication Data

US 2010/0278342 A1    Nov. 4, 2010

(51) Int. Cl.
*H04K 1/00* (2006.01)
(52) U.S. Cl. ........ 380/270; 380/255; 713/168; 713/171; 713/182; 713/186
(58) Field of Classification Search .................. 380/270, 380/255; 713/168, 171, 182, 186
See application file for complete search history.

(56) References Cited

U.S. PATENT DOCUMENTS

| 7,526,653 | B1 * | 4/2009 | Vogel et al. ................... 713/186 |
|---|---|---|---|
| 2002/0146127 | A1 * | 10/2002 | Wong ............................ 380/270 |
| 2004/0162983 | A1 * | 8/2004 | Gotoh et al. .................. 713/171 |
| 2005/0076210 | A1 * | 4/2005 | Thomas et al. ............... 713/165 |
| 2005/0093868 | A1 * | 5/2005 | Hinckley ...................... 345/502 |
| 2007/0143612 | A1 * | 6/2007 | Brown et al. ................. 713/171 |
| 2007/0188323 | A1 * | 8/2007 | Sinclair et al. ............. 340/568.1 |
| 2008/0195735 | A1 * | 8/2008 | Hodges et al. ................ 709/227 |

* cited by examiner

*Primary Examiner* — Nabil El Hady
(74) *Attorney, Agent, or Firm* — Kacvinsky Daisak, PLLC

(57) ABSTRACT

Device, system, and method of establishing secure wireless communication. A system includes at least one wireless communication device having a sensor to measure one or more parameters of a physical event shared between that device and another wireless communication device, and a processor to translate the one or more measured parameters into a secret data sequence known only to the devices sharing the event. A first of the wireless communication devices sharing the event is to combine a communication key with the secret data sequence, thereby to generate an encoded message for distribution over a wireless link accessible by the devices, and a second of the wireless communication devices sharing the event is to decode said encoded message using the secret data sequence, thereby to obtain the communication key. The wireless communication devices may then connect using the secret communication key as a basis for secure communication.

13 Claims, 2 Drawing Sheets

DEVICE, SYSTEM, AND METHOD OF ESTABLISHING SECURE WIRELESS COMMUNICATION

BACKGROUND

A user of a wireless communication device may require secure communication, e.g., in order to securely exchange data with another wireless communication device. Currently, setting up a secure connection between two wireless communication devices can be an onerous process. Typically, an a priori network connection is required and is then manually made secure, e.g., by typing in a configuration code, or by using an out-of-band mechanism to set up a shared key. This can make the interaction difficult or cumbersome to use.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
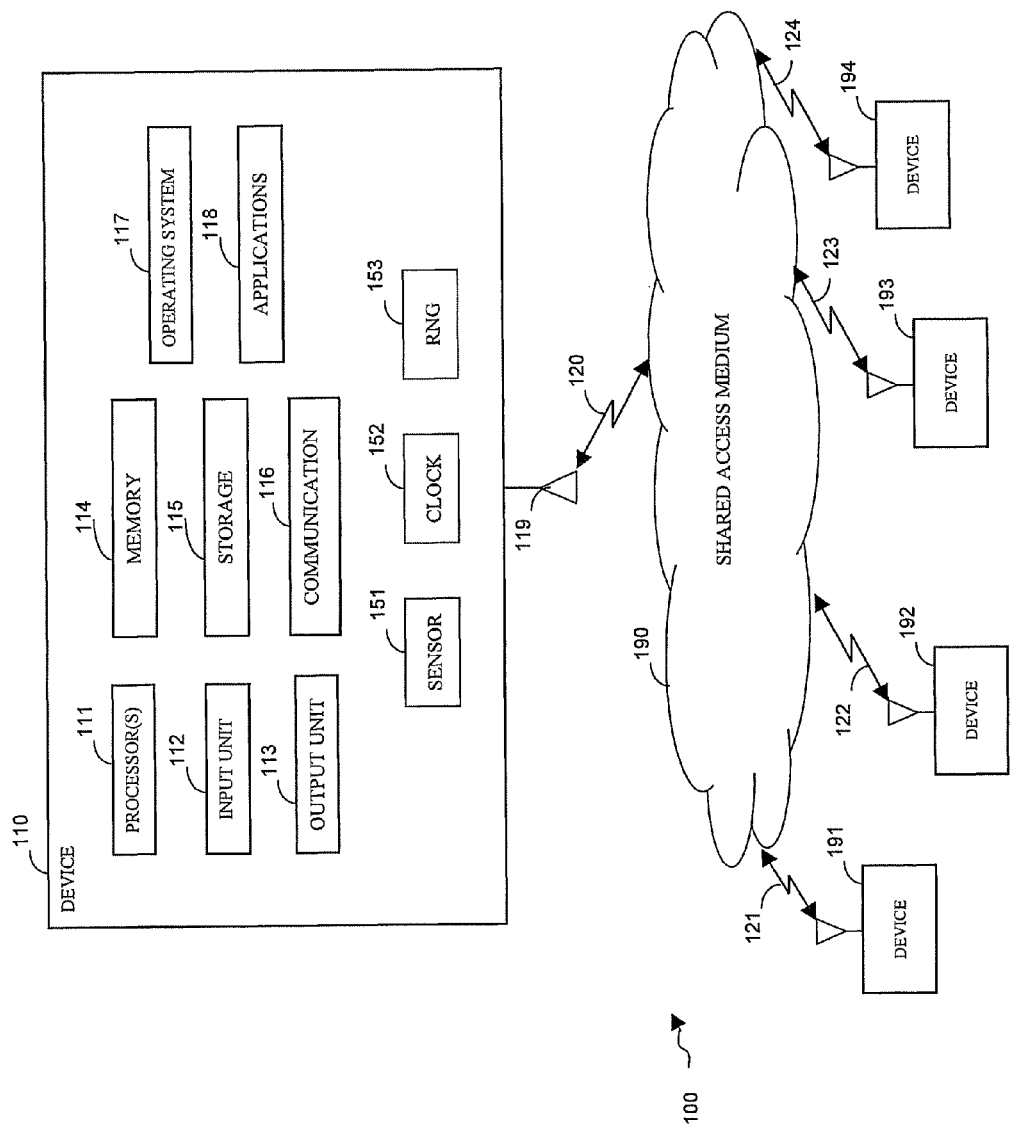
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. In addition, the terms "plurality" and "a plurality" as used herein include, for example, "multiple" or "two or more". The terms "plurality" or "a plurality" may be used throughout the specification to describe two or more components, devices, elements, units, parameters, or the like.

Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RED element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, a wireless application protocol (WAP) device, or the like.

Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), Wideband CDMA (WCDMA), CDMA 2000, single-carrier CDMA, multi-carrier CDMA, multi-carrier modulation (MCM), discrete multi-tone (DMT), Bluetooth®, global positioning system (GPS), WiFi, WiMax, ZigBee™, ultra-wideband (UWB), global system for mobile communication (GSM), 2G, 2.5G, 3G, 3.5G, enhanced data rates for GSM evolution (EDGE), or the like. Embodiments of the invention may be used in various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

FIG. 1 schematically illustrates a block diagram of a system 100 in accordance with some demonstrative embodiments of the invention. System 100 includes, for example, a mobile device 110 able to communicate using a wireless shared access medium 190 with one or more other devices such as a wireless access point (AP) 191, a wireless base station 192, a wireless communication device 193, a wireless communication station 194, and the like. Components of system 100 may communicate via using one or more wireless links such as links 120-124.

Devices 191-194 may have wireless communication capabilities. In some embodiments, for example, each one of devices 191-194 may be able to communicate with mobile device 110 using one or more wireless communication links, e.g., IEEE 802.11 communication, IEEE 802.16 communication, Bluetooth communication, Ultra WideBand (UWB) communication, or the like.

Device 110 may be or may include, for example, a mobile phone, a cellular phone, a handheld device, a computing device, a computer, a mobile computer, a portable computer, a laptop computer, a notebook computer, a tablet computer, a hybrid device (e.g., combining cellular phone functionalities with PDA device functionalities), a relatively small computing device, a non-desktop computer, a portable device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Device 110 may include, for example, one or more processors 111, an input unit 112, an output unit 113, a memory unit 114, a storage unit 115, and a communication unit 116. Processor 111 executes instructions, for example, of an operating system (OS) 117 of device 110 and/or of one or more applications 118. Memory unit 114 and/or storage unit 115, for example, store data processed by device 110. Communication unit 116 may be or may include, for example, a wireless radio frequency (RF) transceiver able to transmit and/or receive wireless RF signals, blocks, frames, transmission streams, packets, messages and/or data, e.g., through one or more antennas 119 and using wireless communication link 120.

Device 110 may optionally include other suitable hardware components and/or software components. These include, for example, a sensor 151, a clock 152, and a random number generator (RNG) 153. Sensor 151 may include, for example, an accelerometer, an on-platform sensor, an on-board microphone, or other physical sensor suitable for gathering data and/or measuring parameters regarding a physical event experienced by device 110. Clock 152 may include, for example, a real-time clock, a system clock, a counter, a timer, a component able to perform timing or counting operations, a component able to track time, a component able to provide time data or time parameters, or the like. RNG 153 may include a random or pseudo-random number generator.

A user of device 110 may wish to exchange data in a secure manner with another device, e.g., with device 193. A method of establishing secure communication in accordance with a demonstrative embodiment of the invention is described with reference to FIG. 2.

Figure 2:
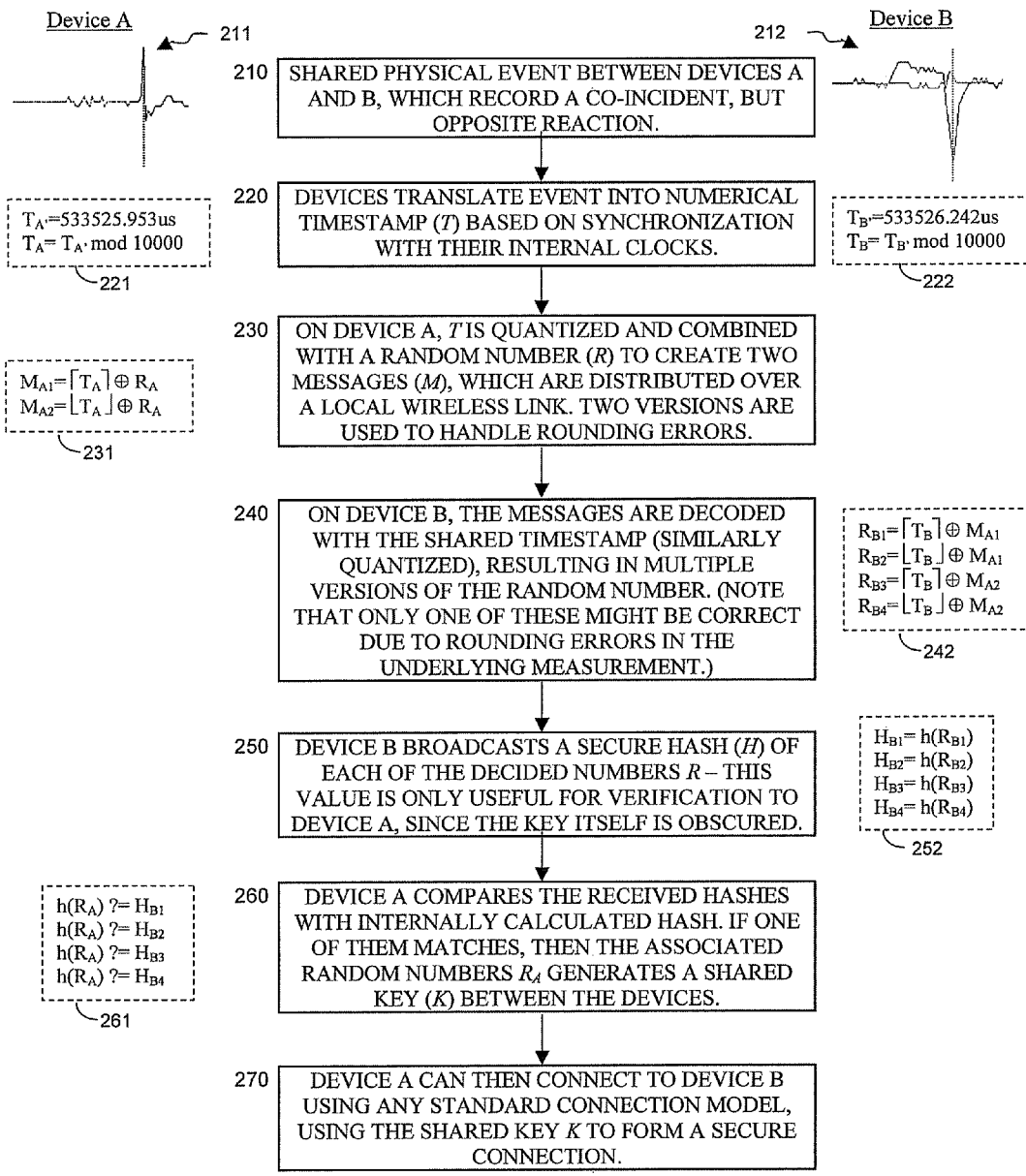
FIG. 2 is a schematic a block diagram of a method of establishing secure wireless communication in accordance with some demonstrative embodiments of the invention.

FIG. 2 schematically illustrates a method of establishing secure wireless communication in accordance with some demonstrative embodiments of the invention. For example, a user of device 110 (referred to as device A) may wish to exchange data in a secure manner with another device (referred to as device B), e.g., with device 193. In some embodiments, devices A and B may both have access to the shared wireless medium 190, but may not have a connection with each other already established.

As indicated at block 210, the secure connection process may be triggered by a physical event that is shared between devices A and B, such as bumping the devices together. The shared physical event may be used as a basis for setting up a secure wireless connection between the two devices. For example, an event may be detected and monitored by each device by looking at sensor data, e.g., accelerometer data provided by sensor 151. One or more parameters of the event, including timing data provided by clock 152, may be measured and recorded.

Optionally, in some embodiments an event may register only if the parameters are above a designated threshold value, e.g., to prevent an inadvertent connection attempt due to accidental impact between devices. In addition, to prevent malicious "attacks" or unwanted connections, some embodiments may require an activation dialog before the bump (e.g., holding down a button), or asking for confirmation after a bump. These user dialogs could be combined with choices for how to react to the event.

Graphs 211 and 212 schematically illustrate the shared event as monitored by device A and by device B, respectively. By monitoring the time and shape of these two events, it is possible to allow that the two devices securely form a connection in accordance with embodiments of the invention. Due to basic laws of physics, both devices will experience similar accelerometer sensor readings, which may be coincident in time but opposite in reaction. For example, bumping device A into device B will cause a sharp jolt to device A to the left, and a corresponding jolt to device B to the right (conservation of momentum). The details of this event, e.g., when it happens, the shape of the jolt, and the like, may then be used to set up a secure connection between the devices. For example, the physical sensor readings may be used to create a shared key between the two devices, as explained herein below, which can then be used to establish a shared connection between them.

As indicated at block 220, the devices may each translate one or more measured parameters of the shared physical event into a secret data sequence, which is assumed to be shared by the devices that experienced the event. For example, in some embodiments the devices may translate the event into a numerical timestamp based on synchronization with their internal clocks. Several different physical aspects may be used to generate one or more shared secrets based on the shared physical event. Some non-limiting examples include precise time of bump, duration between successive bumps (relative time), acoustic timing (shared sound), force of bump (hard vs. soft), and the like. Optionally, in some embodiments one or more of the measured parameters may be combined to foam a single secret.

In essence, the analog sensor data may be distilled down to a binary value that uniquely identifies the event. Some embodiments may require a value on the order of 4-8 digits (similar to the pin codes used for WiFi Protected Setup (WPS) transactions), which may be obtainable from the physical information given sufficient sensing and processing capability. This shared secret data sequence may then be used to set up a key for secure communication between the devices, as described herein below.

For example, as shown in box 221, device A may measure a timestamp $T_{A'}$ of the event, based on an internal clock of device A, and then translate this timestamp into a numerical secret $T_A$. Similarly, as shown in box 222, device B may measure a timestamp $T_{B'}$ of the event, based on an internal clock of device B, and then translate this timestamp into a numerical secret $T_B$. The numerical secrets $T_A$ and $T_B$ may be substantially equal, but are not necessarily precisely equal, e.g., due to rounding errors in the underlying measurement and/or imperfect synchronization between the devices. Some embodiments of the invention include a method of compensating for such slight inaccuracies, as described herein below.

Optionally, some embodiments may use time synchronization between the two devices in order to translate the underlying physical event into a precise shared secret, although it is not necessary. For example, this time synchronization may be supplied by wireless protocols, such as UWB, which coordinate their activities at the MAC layer in order to provide a synchronized beaconing scheme. This wireless channel may then be used to host the secure connection between the two devices. By using precise time synchronization, the underlying physical events may be precisely compared to determine if they truly are the same event.

In some embodiments, the secret data sequence may be used through an extended security protocol to generate a secure communication key for encrypting traffic between the communication devices. Alternatively, the secret data sequence may directly be used to encrypt communication between the devices. Furthermore, in some embodiments the secret data sequence may be used to automatically trigger the connection between devices. For example, a listening device could watch received broadcast transmissions from other nearby mobile devices and initiate a connection between them if the appropriate secret key is detected.

As indicated at block 230, on device A, the numerical secret $T_A$ is quantized and combined with a random number R (a nonce, as it is used only once for each connection that is made) to create two or more encoded messages M for distribution, e.g., broadcast, over a local wireless link. For example, as shown in box 231, a first message $M_{A1}$ may be obtained from a random number $R_A$ applied to the secret value $T_A$, quantized using a ceiling function, and a second message $M_{A2}$ may be obtained from the random number $R_A$ applied to the secret value $T_A$, quantized using a floor function. Multiple encoded messages M may be used to handle rounding errors. The random number R may be used to generate a communication key between the devices, as explained below.

As indicated at block 240, on device B, the encoded messages M are decoded using the similarly quantized secret $T_B$, resulting in multiple interpretations of the random number R. (Possibly, only one of these versions might be correct, e.g., due to rounding errors in the underlying measurement.) For example, as shown in box 242, two versions $R_{B1}$ and $R_{B2}$ of the random number may be obtained from the first message $M_{A1}$ combined with the secret value $T_B$, quantized using a ceiling function and a floor function, respectively; and another two versions $R_{B3}$ and $R_{B4}$ of the random number may be obtained from the second message $M_{A2}$ combined with the secret value $T_B$, quantized using a ceiling function and a floor function, respectively. In some embodiments, other quantization functions may be used As indicated at block 250, device B may distribute, e.g., broadcast, a secure hash H of each of the random numbers that were obtained from decoding the messages M. For example, as shown in box 252, a first hash $H_{B1}$ may be calculated by applying a secure hash function h to the obtained random number $R_{B1}$, a second hash $H_{B2}$ may be calculated by applying a secure hash function h to the obtained random number $R_{B2}$, a third hash $H_{B3}$ may be calculated by applying a secure hash function h to the obtained random number $R_{B3}$, and a fourth hash $H_{B4}$ may be calculated by applying a secure hash function h to the obtained random number $R_{B4}$. The hash values $H_B$ may be useful to device A for verification purposes, but the random numbers are obscured due to the one-way hash function h.

In some embodiments, devices A and B may not yet have an established connection, but may both have access to a shared wireless medium. The encoded messages are calculated by device A and distributed over a wireless link that is accessible by device B. An outside device C, which did not experience the shared physical event of devices A and B, may also receive the encoded messages, but will not be able to obtain the random number R and generate a communication key without the secret data sequence shared by devices A and B. Likewise, device C may intercept the secure hash H, but will not be able to derive the communication key from it.

As indicated at block 260 and box 261, device A compares the received hashes $H_B$ with an internally calculated hash of the random number used to create the messages M. If one of the received hashes matches, then the associated random number $R_A$, now know by both devices, may be used to generate a shared communication key between the devices, such as an encryption key or a connection key.

As indicated at block 270, device A may then connect to device B using any standard connection model, using the random number $R_A$ to generate a key and form a secure connection. Note that at no time during the process is the random number R, which is used to generate the shared key, sent in the clear between the two devices. Instead, the shared secret T is used to encode the underlying communication, or only a secure-hash of the random number R, is sent. After the ability/desire to make a secure connection has been established, any number of techniques (such as creating an encrypted tunnel between the two devices using an open access point, or sharing the ability/desire to form a connection in the information elements of IEEE 802.11 or UWB wireless systems, or through an authenticated Bluetooth paging request) may be used.

Other operations or sets of operations may be used in accordance with some embodiments of the invention.

Some embodiments provide a way to generate secure keys to form an encrypted connection between two devices. The secure-bump-connect mechanism may be advantageous because it is extremely easy to use (very easy to understand connection metaphor), and also only relies on hardware that is already available in some mobile devices. For example, some embodiments may increase the usability of mobile platforms by making them easier to securely connect together (or to other devices in the infrastructure) while providing a compelling user experience. Furthermore, this technique relies on hardware that is already available in some platforms, and so may increase user value without added to system cost.

Some embodiments of the invention make novel use of physical sensor data (e.g., accelerometers) to create a secure connection between devices. Many platforms already have this sensor but it is used for different purposes (e.g., to stop disk drives when a platform is dropped, or to control screen orientation).

Some embodiments of the invention may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes.

What is claimed is:

1. A method for establishing secure wireless communication, the method comprising:
   translating one or more measured parameters of a shared physical event between two or more wireless communication devices into two or more different versions of a secret data sequences using different quantization functions, wherein the two or more different versions of the secret data sequences are known only to the devices sharing said event;
   combining a communication key with the two or more different versions of the secret data sequence to generate at least two different encoded messages for distribution over a wireless link accessible by said two or more wireless communication devices;
   decoding said at least two different encoded messages using the two or more different versions of the secret data sequence to obtain two or more decoded communication keys;
   verifying that at least one of the two or more decoded communication keys matches the communication key; and
   establishing a wireless connection between the two or more wireless communication devices using the communication key as a basis for secure communication.

2. The method of claim 1, wherein to verify if said communication key is correctly obtained from the encoded messages, the method comprises:
   distributing a secure hash of the obtained communication key; and
   determining if the distributed hash matches an independently calculated hash of the applied communication key.

3. The method of claim 1, comprising:
   broadcasting the communication key over a wireless network to one or more other communication devices.

4. The method of claim 1, comprising:
   automatically creating a connection between the wireless communication devices upon receiving an appropriate communication key.

5. The method of claim 1, comprising connecting said devices only if user confirmation is received.

6. The method of claim 1, comprising using the communication key as an encryption key for said secure communication.

7. The method of claim 1, said shared physical event comprises an impact between said wireless communication devices.

8. The method of claim 1, said one or more measured parameters include a timestamp of said event.

9. The method of claim 1, comprising translating the one or more measured parameters of the shared physical event into the two or more different versions of the secret data sequence only if said parameters are above a threshold value.

10. A system for establishing secure wireless communication, the system comprising:
    a first wireless communication device having a sensor to measure one or more parameters of a physical event shared between said first device and a second wireless communication device, the first device comprising a processor to translate said one or more measured parameters into two or more different versions of a secret data sequences using different quantization functions, wherein the two or more different versions of the secret data sequence are known only to the first and second devices sharing said event;
    the first device operative to combine a communication key with the two or more different versions of the secret data sequence to generate at least two different encoded messages for distribution over a wireless link accessible by said first and second devices,
    the second device operative to decode said at least two different encoded messages using the two or more different versions of the secret data sequence to obtain two or more decoded communication keys;
    the first device operative to verifie that at least one of the two or more decoded communication keys matches the communication key; and
    the first and second devices operative to establish a wireless connection using said communication key as a basis for secure communication.

11. The system of claim 10, said second wireless communication device operative to distribute a secure hash of the obtained communication key, and said first wireless communication device operative to determine if the distributed hash matches an independently calculated hash of the applied communication key to verify if said communication key is correctly obtained from the two or more encoded messages.

12. The system of claim 10, the first or second device operative to automatically establish the wireless connection upon receiving an appropriate communication key.

13. The system of claim 10, the first and second devices operative to use the communication key as an encryption key for said secure communication.

* * * * *

UNITED STATES PATENT AND TRADEMARK OFFICE
CERTIFICATE OF CORRECTION

Page 1 of 1

PATENT NO. : 8,170,212 B2
APPLICATION NO. : 12/049833
DATED : May 1, 2012
INVENTOR(S) : Trevor A. Pering et al.

It is certified that error appears in the above-identified patent and that said Letters Patent is hereby corrected as shown below:

In column 7, line 43, in claim 1, delete "sequences" and insert -- sequence --, therefor.

In column 7, line 45, in claim 1, delete "sequences" and insert -- sequence --, therefor.

In column 8, line 33, in claim 10, delete "sequences" and insert -- sequence --, therefor.

In column 8, line 46, in claim 10, delete "verifie" and insert -- verify --, therefor.

Signed and Sealed this
Third Day of July, 2012

David J. Kappos
*Director of the United States Patent and Trademark Office*